United States Patent [19]
Masnik

[11] 4,195,965
[45] Apr. 1, 1980

[54] RAM PUMP FLOWMETER

[76] Inventor: Walter Masnik, 9 Penbroke Dr., Mendham, N.J. 07945

[21] Appl. No.: 914,962

[22] Filed: Jun. 12, 1978

Related U.S. Application Data

[62] Division of Ser. No. 778,930, Mar. 18, 1977, Pat. No. 4,123,941.

[51] Int. Cl.² ............................................. F01D 1/32
[52] U.S. Cl. ............................................. 415/213 R
[58] Field of Search ..................... 415/213 R; 416/186

[56] References Cited
U.S. PATENT DOCUMENTS

| 12,579 | 3/1855 | Barker | 415/213 R |
| 126,639 | 5/1872 | Leffel | 415/213 R X |
| 206,129 | 7/1878 | Phelps | 415/213 R |
| 804,028 | 11/1905 | Neumann | 415/213 R X |
| 839,312 | 12/1906 | Neumann | 415/213 R X |
| 1,988,875 | 1/1935 | Saborio | 415/213 R |

Primary Examiner—William L. Freeh
Attorney, Agent, or Firm—H. Hume Mathews

[57] ABSTRACT

A mass-rate flowmeter of the recirculation type wherein the recirculating flow is created by a ram type centrifugal pump having a substantially constant volume flow discharge rate over the operating pressure range of said mass-rate flowmeter.

1 Claim, 11 Drawing Figures

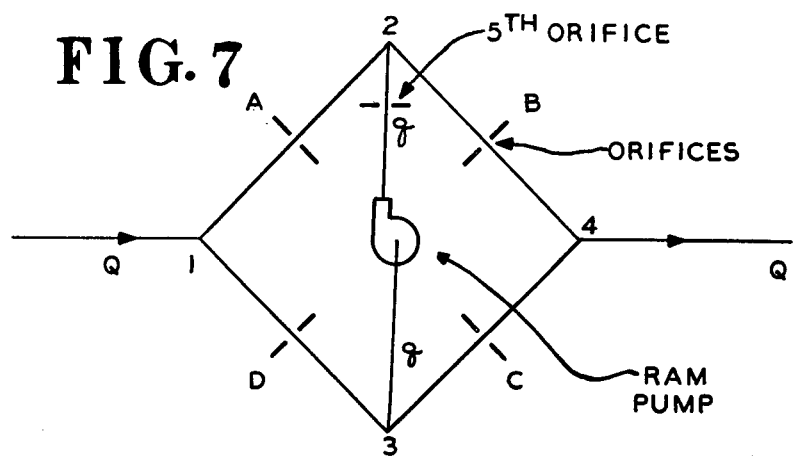
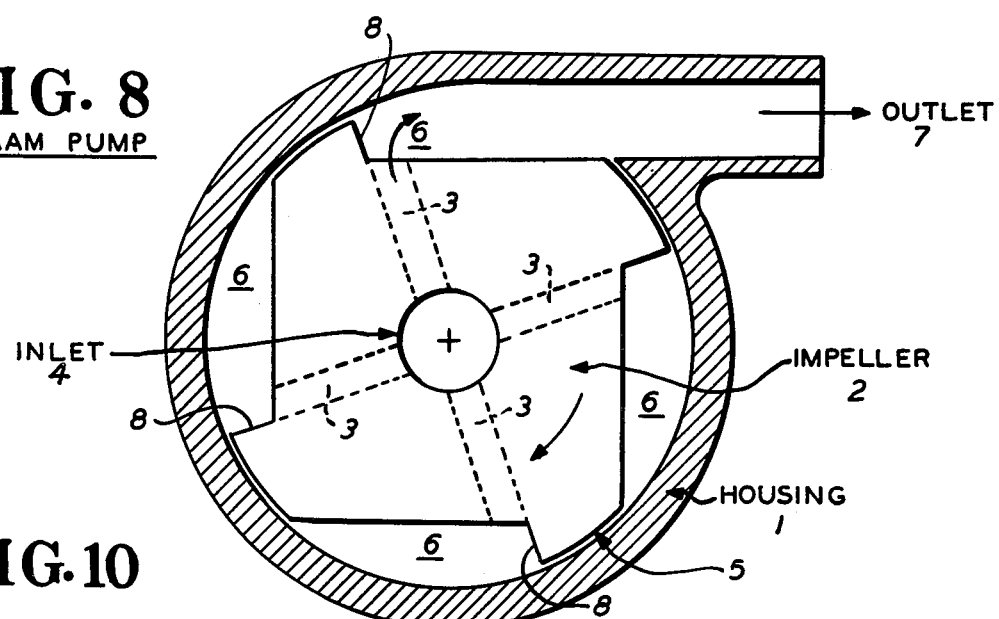
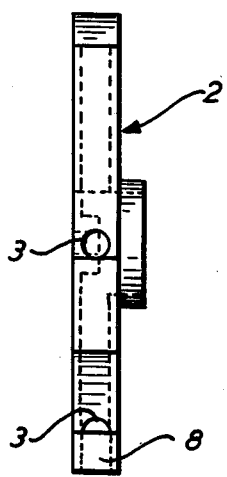
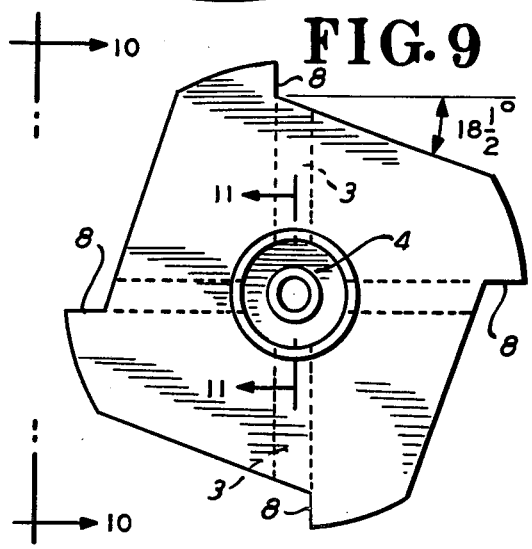
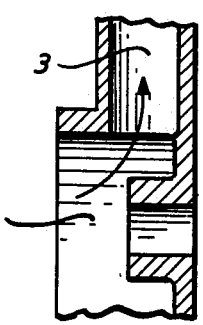

RAM PUMP FLOWMETER

This is a division, of application Ser. No. 778,930, filed Mar. 18, 1977 now U.S. Pat. No. 4,123,941.

BACKGROUND OF THE INVENTION

Mass-rate liquid flow meters of the recirculation type are disclosed in U.S. Pat. Nos. 3,232,104; 3,232,105; and 3,662,599. In these patents a gear pump is used to recirculate a constant volume flow q. Use of a gear pump is satisfactory for liquids having some lubricating quality, sufficient to keep the gears of the pump from wearing. However, in many applications the liquids being measured have either no lubricity or are chemically corrosive or both. A typical liquid without lubricity is water. Water has a corrosive effect on plain steel gears. Other liquids that have a much more corrosive effect are the many acids and bases that are used in the petrochemical industry. If one were to use a steel gear pump for such liquids, corrosion and wear of the gears would result. This would increase the leakage across the gears and hence change the value of q. One could use gears made out of stainless steel. However, stainless gears present the problem of galling, i.e., the tendency of the gear surfaces to stick or bind when they contact during pump operation. Centrifugal pumps, which have no rubbing surfaces exposed to the liquid flowing through the pump, have previously been considered unsuitable for use in mass-rate flowmeters because the pumping capacity of centrifugal pumps changes considerably with changes in the pressure differential across the pump.

Thus, a centrifugal pump does not have a constant volumetric flow when its pressure rise is varied. Further, centrifugal pump characteristics change with the viscosity of the liquid. Therefore, centrifugal type pumps have not, prior to the present invention, been used for creating the recirculating flow in mass-rate liquid flowmeters such as disclosed in the prior art patents identified above.

SUMMARY OF THE INVENTION

According to the present invention, a new mass-rate flowmeter is provided which obviates the above mentioned problems encountered with a gear pump and which enables the advantages of a centrifugal type pump to be obtained. The centrifugal pump, as pointed out above, can be made of materials that will withstand corrosion, including corrosion by chemicals such as acids, bases and other corrosive liquids. Because centrifugal pumps have rotating impellers with no rubbing parts as in the gear pump, there is no concern for wear.

The present invention also involves the provision of a new centrifugal pump, herein referred to as a "ram" pump. This new pump is characterized by the ability to operate, in the lower $\Delta P$ range (the lower range of pressure differentials between the pump inlet and the pump outlet), with pumping characteristics that are substantially the same as those of the previously used gear pumps.

There is another problem associated with the use of a centrifugal pump in mass-rate flowmeters as disclosed in the above identified prior art patents. With centrifugal pumps, there are variations in output flow rate with changes in viscosity of the liquid being pumped. According to the present invention, this problem also can be solved. For example, a fifth restrictor may be provided at the outlet of the ram pump, having flow characteristics which compensate for the pump output variations resulting from viscosity changes. An alternate method is by designing the four restrictors in the branch conduits to provide such compensation.

BRIEF DESCRIPTION OF THE DRAWINGS

FIG. 7 is a schematic diagram of the ram pump mass-rate flowmeter system of the present invention, showing the location of the ram pump and the fifth restrictor relative to the branch conduits.

FIG. 8 is a sectional view of the new ram pump of the present invention with the ram impeller in the pump housing.

FIG. 9 is an elevational view of the impeller shown in FIG. 8.

FIG. 10 is an elevational view of the impeller along the line 10—10 of FIG. 9.

FIG. 11 is a cross-sectional view, along the line 11—11, of the middle portion of the impeller shown in FIG. 9.

DETAILED DESCRIPTION OF A PREFERRED EMBODIMENT OF THE INVENTION

Consider the flow equation of a Flo-Tron meter, such as disclosed in U.S. Pat. Nos. 3,232,104; 3,232,105; and 3,662,599, and for the case shown in FIG. 3:

$$\Delta P_{1-4} = (qkW)/(C^2 A^2) \qquad \text{Eq. (1)}$$

where $(qk)/(C^2 A^2)$ is normally a constant and:

$\Delta P_{1-4}$ = differential pressure output signal
q = volumetric recirculating flow
W = measured means flow passing through the meter
$C^2$ = orifice coefficient of meter
$A^2$ = area of orifice
k = constant From this equation it can be seen that if recirculating flow q were to vary then $\Delta P_{1-4}$ would vary not only with mass flow rate W, but also with recirculating flow q.

Figure 1:
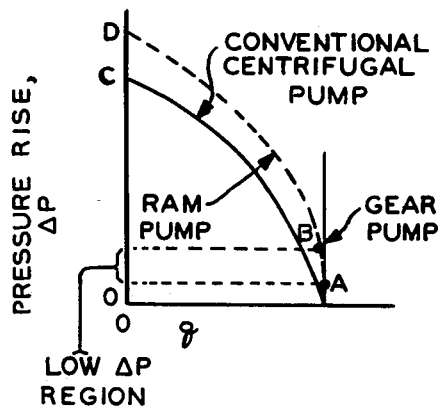
FIG. 1 is a graph showing the relationship between flow rate and pressure rise of the ram pump of the present invention as compared to the prior art centrifugal pumps and gear pumps.

A centrifugal pump does not have a constant volumetric flow when its pressure rise is varied. FIG. 1 shows the variation of flow rate q versus pressure rise $\Delta P$ for a gear pump, a conventional centrifugal pump and the novel centrifugal pump of the present invention, herein referred to as a ram pump. The gear pump is a positive displacement pump and, therefore, meets the requirements of delivering a constant volume flow, regardless of pressure rise. On the other hand, a conventional centrifugal pump has a changing (decreasing) flow with increasing pressure rise across the pump.

It will be seen that the ram pump of the present invention, when operating in the region of low $\Delta P$ as shown in FIG. 1, very closely approximates the constant volume flow characteristics of the gear pump. This low $\Delta P$ region is the selected region in which the ram pump operates in the mass-rate flowmeter of the present invention.

The construction of the ram pump of the present invention is shown in FIGS. 8, 9, 10 and 11. It comprises a housing 1 enclosing the impeller 2. The impeller is a solid disc having a multiplicity of flow passages 3, respectively connecting the impeller inlet 4 to a multiplicity of cavities 6 spaced around the periphery 5 of the impeller.

When the impeller rotates a pressure determined by the centrifugal force on the liquid in passages 3 is generated in transversely extending discharge cavities 6, formed by scalloped portions in the periphery of the impeller. The impeller has a close fit between its periphery 5 and the housing 6 to prevent leakage and dissipation of the pressure of trapped liquid in the cavities 6.

Rotation of the impeller causes liquid entering the inlet 4 to flow radially outward through the passages 3 and into the transversely or tangentially extending cavities 6. These cavities are thus filled, as the impeller rotates, and when each cavity, in turn, arrives at the rotational position wherein it connects with the outlet 7, as shown in FIG. 8, the liquid in that cavity is positively displaced through the pump outlet port 7 by the piston-like effect of the impeller face 8 forming the rear wall of the cavity.

Thus, although the pump is a centrifugal pump in that centrifugal force causes the outward flow of liquid through passages 3, and thereby pressurizes the liquid in the cavities 6, it additionally creates a "ram" pressure by the piston-like effect created by the movement of cavity 6, and its rear wall 8, past the discharge port 7 of the pump housing. The resultant pressure head in the outlet 7 is herein referred to as the ram pressure.

Referring to FIG. 1, the ram pressure created by the novel pump of this invention will be seen to be substantially the same in constant flow characteristics as that of the conventional gear pump in the lower range of pressure rise across the pump. Because the ram pump pressure rise curve is very steep between points A and B of the region in which the ram pump would be operating in the mass-rate flowmeter of the present invention, it can successfully be utilized in the mass-rate flowmeter of the present invention.

Figure 5:
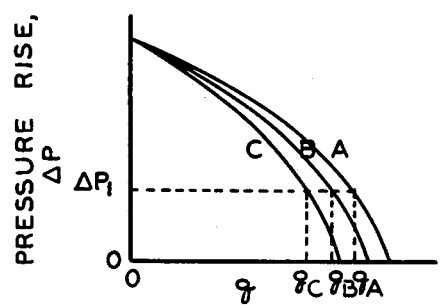
FIG. 5 is a graph of the relationship between the pressure rise $\Delta P$ and the flow rates q, for a centrifugal pump (including the ram pump of the present invention), for liquids having different viscosities.

Centrifugal pump characteristics change with the viscosity of the liquid being pumped. This is also true, to some extent, of the ram pump. This is shown in FIG. 5, where the curves A, B, C are for liquids of different viscosities with C being the highest viscosity liquid. As shown on the curves, for a constant pressure rise $\Delta P_1$ different q's result with different viscosities—that is, the recirculating flow q decreases with increasing viscosity. This decrease in q, however, can be offset by having orifices in the meter bridge with a decreasing coefficient.

Figure 6:
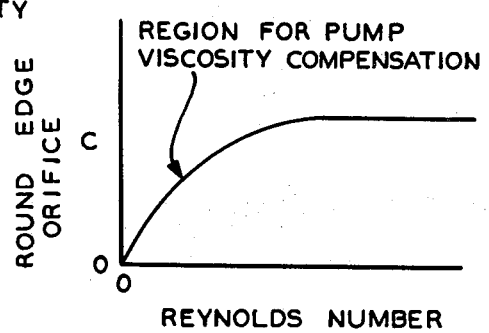
FIG. 6 is a graph of the relationship between orifice coefficient C and the Reynolds number for a round edge orifice.

Referring to Equation 1, if q and $C^2$ both change in the same proportion then their ratio $q/C^2$ remains a constant. Round edge orifices have such a characteristic as shown in FIG. 6. One can see that the orifice flow coefficient decreases with decreasing Reynolds number. Reynolds number, which relates liquid viscosity to liquid flow, is a dimensionless parameter whose equation is:

Reynolds No. = sVD/u where
s = liquid density
V = liquid velocity
D = diameter of flow opening
u = viscosity Thus, for increasing viscosity the Reynolds number decreases and, as shown in FIG. 6, this increasing viscosity brings about a decrease in the flow coefficient C. Therefore, by suitably matching the rounded orifice coefficients with the pump characteristics, a mass flow meter can be provided capable of operating over a very wide viscosity range with the output signal linear and proportional to mass flow.

Figure 2:
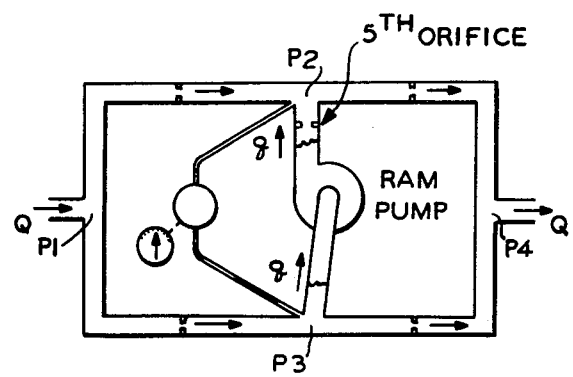
FIG. 2 is a schematic flow diagram of the ram pump mass-rate flowmeter system of the present invention, wherein the constant volumetric recirculating flow q is less than the input volumetric flow Q.
Figure 3:
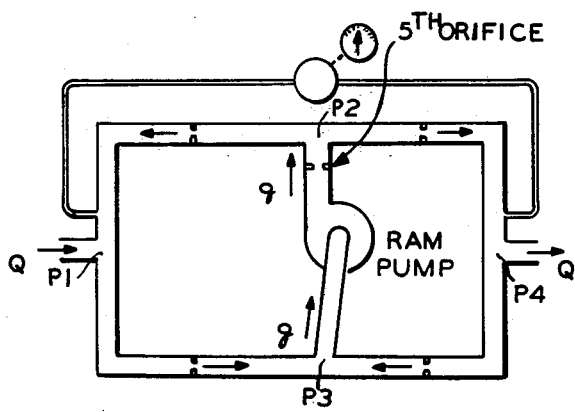
FIG. 3 is a schematic diagram of the ram pump mass-rate flowmeter system of the present invention wherein the constant volumetric recirculating flow q is greater than the input volumetric flow Q.

Another approach for compensating the decreasing pump flow with increasing liquid viscosity is to place a fifth orifice in the flow line connecting the discharge port of the pump to a branch conduit at a point intermediate the restrictors in the branch conduit, as shown in FIGS. 2, 3 and 7. The fifth orifice is designed to have a flow coefficient that will increase with increasing viscosity of the liquid.

Figure 4:
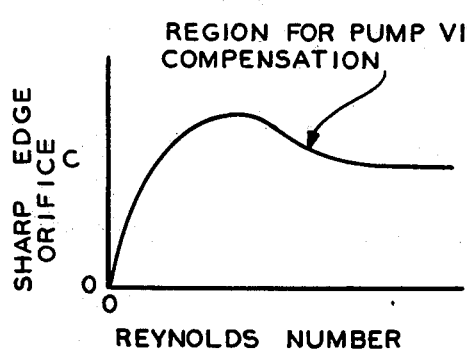
FIG. 4 is a graph of the relationship between orifice coefficient C for a sharp edge orifice and the Reynolds number.

An increasing flow coefficient means there is less resistance to flow with increasing viscosity. Therefore, by proper matching of the flow coefficient of the fifth orifice with the ram pump characteristic it is possible to maintain a constant recirculating flow through the flowmeter regardless of viscosity variation of the liquid. FIG. 4 illustrates a sharp edge orifice flow coefficient that can be used for pump viscosity compensation.

The flow equation for an orifice is $$q = CA\sqrt{(\Delta P/s)}$$

where
q = volume flow
C = orifice flow coefficient
A = orifice area
$\Delta P$ = pressure drop across the orifice
s = liquid density From this equation one can readily see that raising or lowering the value of C will raise or lower the value of q for a given $\Delta P$.

When referring to "sharp edge" or "rounded edge" orifices, the edges referred to are those on the side of the orifice from where the liquid flows into the orifice.

The viscosity compensation techniques just described are for the case of the pump having decreasing flow with increasing viscosity. In the event the pump should have the opposite effect, that is, increasing flow with increasing viscosity, similar compensation techniques can still be used but with the use of sharp edge and round edge orifices reversed. In other words, in the case of the fifth orifice the orifice would be a rounded edge orifice and in the case where the bridge orifices are used for compensation they would be sharp edged orifices.

It is also possible to use a combination of both techniques for viscosity compensation of the pump. That is, a fifth orifice, as well as compensation type bridge orifices.

Further, in the case of the bridge orifice either a pair of the orifices could be used having the identical correct compensating flow coefficient, or all four orifices may have identical flow coefficients for compensation.

Measurement of the signal indicative of mass flow, in the apparatus of the present invention, is described in the above referred to prior art patents and is illustrated in FIGS. 2 and 3 hereof.

The flow capacity of the passages 3 can be so proportioned (in cross-sectional area) relative to the volume of cavities 6 that a particular cavity will fill completely with liquid pumped thereunto by the passage 3 during rotation of the impeller from the position wherein the rear wall 8 of a particular cavity has just passed the pump discharge port to the position wherein the cavity is initially opened to the pump discharge port.

I claim:

1. A centrifugal liquid pump having a substantially constant volume liquid flow characteristic in the lower portion of the pump operating pressure range comprising a rotatable impeller, a casing surrounding and enclosing said impeller having a single discharge port therein for receiving liquid pumped by said impeller, said impeller being in the form of a disc having cutaway portions spaced circumferentially around its periphery forming a plurality of circumferentially spaced cavities separated by lobes between said cavities, said lobes having outer circumferentially curved surfaces forming a close fit with the circumferentially curved inner wall surface of said casing to form circumferentially extending seals between said cavities, thereby preventing escape of liquid in each cavity except through said discharge port during the time when the respective cavity is in flow communication with said discharge port, each said cavity being in flow communication with said discharge port in the pump casing during a portion only of each revolution of the impeller, and at least one radially extending flow passage in said impeller connecting the rear end of each said cavity, with respect to the direction of rotation of said impeller, to a liquid inlet located adjacent the axis of rotation of said impeller, the arrangement of said radially extending flow passages, said cavities, and said discharge port being such that each said cavity is filled with liquid forced outwardly through a radial flow passage by centrifugal force exerted on the liquid as a result of rotation of said impeller during that portion of each revolution of the impeller when said cavity is not in communication with said discharge port, and that the liquid in said cavity is discharged through said discharge port during that portion of each revolution of said impeller when said cavity is in flow communication with said discharge port.

* * * * *